US012639868B2

(12) United States Patent
Shin

(10) Patent No.: US 12,639,868 B2
(45) Date of Patent: May 26, 2026

(54) SIMULATING LIGHT REFLECTING OFF AN OBJECT

(71) Applicant: Google LLC, Mountain View, CA (US)

(72) Inventor: Dongeek Shin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 100 days.

(21) Appl. No.: 18/726,060

(22) PCT Filed: Jan. 13, 2022

(86) PCT No.: PCT/US2022/070190
§ 371 (c)(1),
(2) Date: Jul. 1, 2024

(87) PCT Pub. No.: WO2023/136936
PCT Pub. Date: Jul. 20, 2023

(65) Prior Publication Data
US 2025/0061628 A1    Feb. 20, 2025

(51) Int. Cl.
*G06T 11/60*        (2026.01)
*G06T 7/40*         (2017.01)
(Continued)

(52) U.S. Cl.
CPC .............. *G06T 11/60* (2013.01); *G06T 7/40* (2013.01); *G06V 10/764* (2022.01); *G06V 10/82* (2022.01);
(Continued)

(58) Field of Classification Search
CPC ....... G06T 11/60; G06T 7/40; G06T 2210/52; G06V 20/70; G06V 10/82; G06V 10/764; G06F 3/14
See application file for complete search history.

(56) References Cited

U.S. PATENT DOCUMENTS

| | | | |
|---|---|---|---|
| 8,344,995 B2* | 1/2013 | Jeon | G06F 3/0416 |
| | | | 715/784 |
| 8,508,666 B2* | 8/2013 | Higuchi | H04N 5/58 |
| | | | 348/673 |

(Continued)

OTHER PUBLICATIONS

Alhakamy et al., "Real-time Illumination and Visual Coherence for Photorealistic Augmented/Mixed Reality", ACM Computing Surveys, vol. 53, No. 3, May 28, 2020, 35 pp.

(Continued)

*Primary Examiner* — Cheng Yuan Tseng
(74) *Attorney, Agent, or Firm* — Shumaker & Sieffert, P.A.

(57)        ABSTRACT
A computing device is described that includes one or more processors, an image sensor that captures an image at a location of the computing device, and at least one module. The at least one module is operable by the one or more processors to capture, by the image sensor of the computing device, an image frame, determine, based on the image frame, one or more characteristics of light produced by one or more light sources, apply a light source image, generated with the one or more characteristics of light associated with the one or more light sources, to an image of an object, to generate an adjusted image to simulate effects of the one or more light sources on the object; and output, for display by the computing device, the adjusted image.

19 Claims, 4 Drawing Sheets

(51) Int. Cl.

| | |
|---|---|
| *G06V 10/764* | (2022.01) |
| *G06V 10/82* | (2022.01) |
| *G06V 20/70* | (2022.01) |
| *G06F 3/14* | (2006.01) |

(52) U.S. Cl.
CPC ............... *G06V 20/70* (2022.01); *G06F 3/14* (2013.01); *G06T 2210/52* (2013.01)

(56) References Cited

U.S. PATENT DOCUMENTS

| | | | | |
|---|---|---|---|---|
| 8,749,478 | B1 * | 6/2014 | Bowen | G09G 5/003 |
| | | | | 345/107 |
| 8,963,901 | B2 * | 2/2015 | Chang | G09G 3/3611 |
| | | | | 345/207 |
| 9,245,484 | B2 * | 1/2016 | Yamazaki | G06F 3/0483 |
| 9,743,486 | B2 * | 8/2017 | Chuang | G06F 1/1694 |
| 9,984,634 | B2 * | 5/2018 | Reeves | G02F 1/167 |
| 10,048,764 | B2 * | 8/2018 | Kang | G01B 11/22 |
| 11,012,603 | B2 * | 5/2021 | Suman | H04N 23/60 |
| 11,217,021 | B2 | 1/2022 | Motta et al. | |
| 11,378,804 | B2 * | 7/2022 | Terashima | G02B 27/0172 |
| 11,410,622 | B2 * | 8/2022 | Zhang | G09G 5/10 |
| 11,531,390 | B1 * | 12/2022 | Canberk | G06F 18/22 |
| 11,699,708 | B2 * | 7/2023 | Bai | G09G 3/3453 |
| | | | | 257/79 |
| 11,790,498 | B1 * | 10/2023 | Zhang | G09G 5/14 |
| | | | | 345/589 |
| 12,099,657 | B2 * | 9/2024 | Lee | G06F 1/1694 |
| 2008/0122821 | A1 * | 5/2008 | Nilsson | G01J 1/0233 |
| | | | | 345/207 |
| 2013/0135295 | A1 * | 5/2013 | Li | H04N 13/156 |
| | | | | 345/419 |
| 2014/0285477 | A1 | 9/2014 | Cho et al. | |
| 2014/0333656 | A1 | 11/2014 | Wang | |

| | | | | |
|---|---|---|---|---|
| 2015/0187108 | A1 * | 7/2015 | Mullins | G06T 11/60 |
| | | | | 345/633 |
| 2015/0346511 | A1 * | 12/2015 | Osterhout | G02C 11/10 |
| | | | | 351/119 |
| 2016/0210932 | A1 | 7/2016 | Imana | |
| 2016/0358538 | A1 * | 12/2016 | Schuch | G09G 3/2003 |
| 2017/0007459 | A1 * | 1/2017 | Deng | H04N 23/57 |
| 2019/0139512 | A1 * | 5/2019 | Chen | G09G 3/2003 |
| 2019/0369752 | A1 * | 12/2019 | Ikeda | G02B 27/017 |
| 2019/0377948 | A1 * | 12/2019 | Lee | G06V 40/18 |
| 2020/0151956 | A1 * | 5/2020 | Goslin | G02B 27/0172 |
| 2020/0192089 | A1 * | 6/2020 | Haddick | G06F 3/005 |
| 2020/0242845 | A1 * | 7/2020 | Jones | A61B 90/37 |
| 2021/0097943 | A1 | 4/2021 | Wyatt | |
| 2022/0044489 | A1 * | 2/2022 | Konings | G06T 13/40 |
| 2022/0262077 | A1 * | 8/2022 | Kim | H04L 67/52 |

OTHER PUBLICATIONS

First Examination Report from counterpart Indian Application No. 202447053861 dated Aug. 12, 2025, 12 pp.

Gardner et al., "Learning to Predict Indoor Illumination from a Single Image", ACM Transactions on Graphics, vol. 36, No. 6, Nov. 2017, pp. 1-14.

International Search Report and Written Opinion of International Application No. PCT/US2022/070190 dated Nov. 29, 2022, 17 pp.

Invitation to Pay Additional Fees and, Where Applicable, Protest Fee from International Application No. PCT/US2022/070190 dated Oct. 6, 2022, p. 10.

Kan et al., "DeepLight: light source estimation for augmented reality using deep learning", The Visual Computer, vol. 35, No. 6, Springer, May 7, 2019, 11 pp.

Response to Communication Pursuant to Rules 161(1) and 162 EPC dated Jul. 9, 2024, from counterpart European Application No. 22705503.5, filed Jan. 2, 2025, 28 pp.

\* cited by examiner

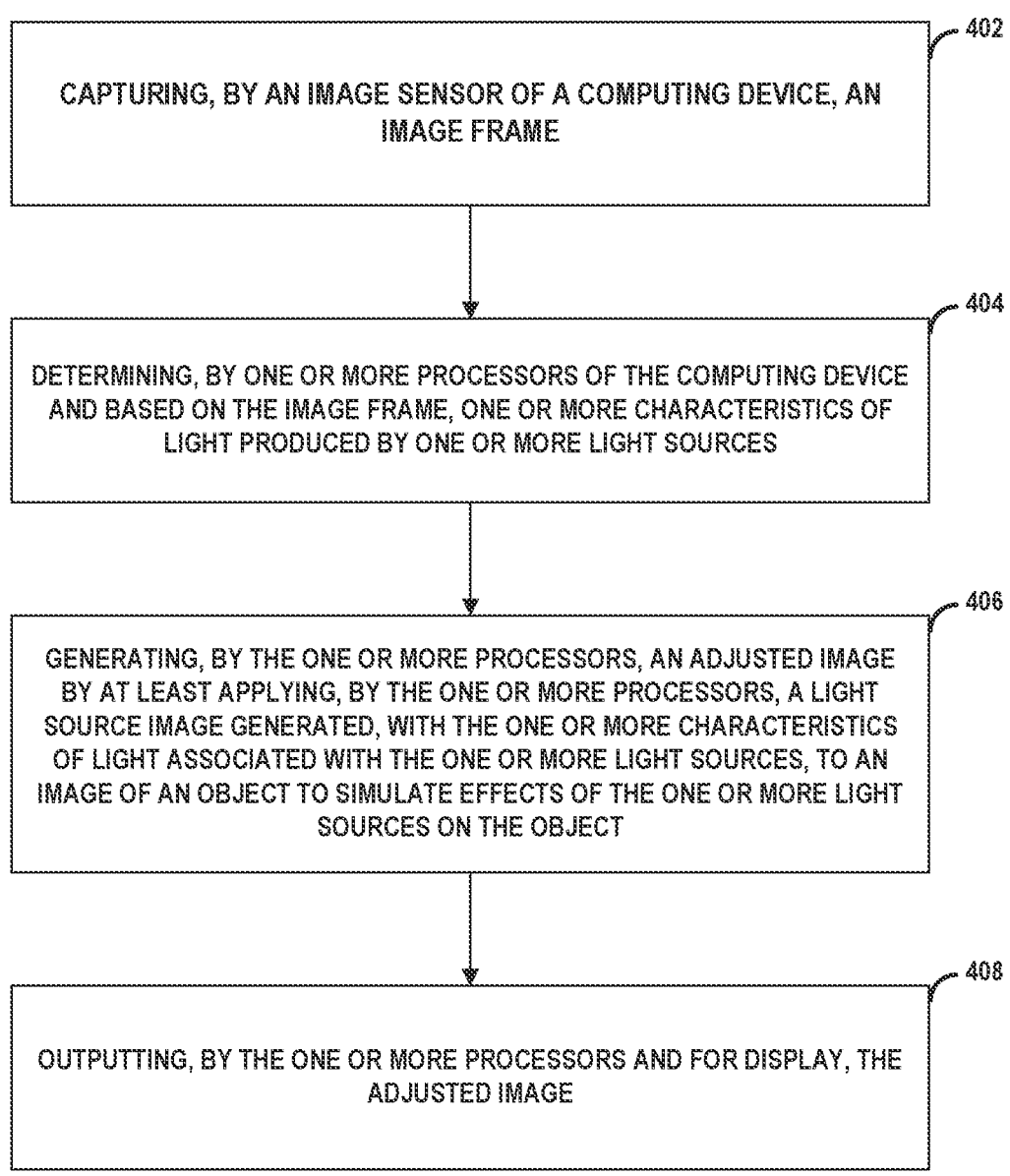

402

CAPTURING, BY AN IMAGE SENSOR OF A COMPUTING DEVICE, AN IMAGE FRAME

404

DETERMINING, BY ONE OR MORE PROCESSORS OF THE COMPUTING DEVICE AND BASED ON THE IMAGE FRAME, ONE OR MORE CHARACTERISTICS OF LIGHT PRODUCED BY ONE OR MORE LIGHT SOURCES

406

GENERATING, BY THE ONE OR MORE PROCESSORS, AN ADJUSTED IMAGE BY AT LEAST APPLYING, BY THE ONE OR MORE PROCESSORS, A LIGHT SOURCE IMAGE GENERATED, WITH THE ONE OR MORE CHARACTERISTICS OF LIGHT ASSOCIATED WITH THE ONE OR MORE LIGHT SOURCES, TO AN IMAGE OF AN OBJECT TO SIMULATE EFFECTS OF THE ONE OR MORE LIGHT SOURCES ON THE OBJECT

408

OUTPUTTING, BY THE ONE OR MORE PROCESSORS AND FOR DISPLAY, THE ADJUSTED IMAGE

FIG. 4

SIMULATING LIGHT REFLECTING OFF AN OBJECT

BACKGROUND

Computing devices typically include a display and a camera. The camera may be used to capture images as directed by a user and/or an application executing on the computing device. The display may be used to interact with the computing device and provide images of objects to a user from various sources, such as installed applications, like a web browser or an e-book that displays text, photographs, or other content. However, the objects in the images are rendered as originally captured and digitally stored and not how the object would appear at the user's location under current lighting conditions.

SUMMARY

In general, techniques of this disclosure are directed to simulating, on a display of a computing device, light reflecting off an object. The computing device may use an image sensor to capture an image to determine light source objects within the scene of the captured image based on one or more characteristics of the light. These objects may be determined from the image by various image analysis techniques run locally or remotely, such as image texture analysis, class object detectors and the like, which results in the creation of a light source image. The light source image may be processed locally or remotely through a rendering network, for example, a trained neural network, to generate an adjusted image that simulates and represents the lighting of the scene as captured in the image by the image sensor. The adjusted image may be overlayed on the image being displayed on the computing device to simulate viewing the object in the natural lighting as captured by the image sensor. This process may be repeated at selected intervals to account for movement or reorientation of the display of the computing device, for example, when the movement exceeds a threshold value.

In one example, this disclosure describes a method that includes, capturing, by an image sensor of a computing device, an image frame, and determining, by one or more processors of the computing device and based on the image frame, one or more characteristics of light produced by one or more light sources. The method further includes generating, by the one or more processors, an adjusted image by at least applying, by the one or more processors, a light source image generated, with a mask image based on the one or more characteristics of light associated with one or more light sources, to an image of an object to simulate effects of one or more light sources on the object, and outputting, by the one or more processors and for display, the adjusted image.

In another example, a computing device includes one or more processors, an image sensor, a display and at least one module. The at least one module is operable by the one or more processors to capture, by an image sensor of the computing device, an image frame, determine, based on the image frame, one or more characteristics of light produced by one or more light sources, apply a light source image, generated with the one or more characteristics of light associated with one or more light sources, to an image of an object to generate an adjusted image to simulate effects of one or more light sources on the object, and output, for display by the computing device, the adjusted image.

In an additional example, a computer-readable storage medium comprising instructions that, when executed, configure one or more processors of a computing system to capture, by an image sensor of the computing device, an image frame, determine, based on the image frame, one or more characteristics of light produced by one or more light sources, apply a light source image, generated with the one or more characteristics of light associated with one or more light sources, to an image of an object to generate an adjusted image to simulate effects of one or more light sources on the object, and output, for display by the computing device, the adjusted image.

In another example, a computing device comprising means for capturing an image frame, and means for determining, based on the image frame, one or more characteristics of light produced by one or more light sources. The method further includes means for generating an adjusted image by at least applying a light source image generated, with a mask image based on the one or more characteristics of light associated with one or more light sources, to an image of an object to simulate effects of one or more light sources on the object, and means for outputting the adjusted image.

The details of one or more examples of the disclosure are set forth in the accompanying drawings and the description below. Other features, objects, and advantages will be apparent from the description and drawings, and from the claims.

BRIEF DESCRIPTION OF DRAWINGS

FIG. 4 is a flowchart illustrating an example mode of operation for a computing device to simulate, on a display of a computing device, effects of one or more light sources on the object, in accordance with one or more techniques of the present disclosure.

DETAILED DESCRIPTION

Throughout the disclosure, examples are described where a computing device and/or a computing system analyzes information (e.g., screen content, image captures, locations, context, motion, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, contents of a screen, an image capture, motion, etc.), or to dictate whether and/or how to the device and/or system may receive content that may be relevant to the user. In addition, certain data may be treated in one or more ways before it is stored or used by the computing device and/or computing system, so that personally identifiable information is removed. For example, a user's identity and image may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

Figure 1:
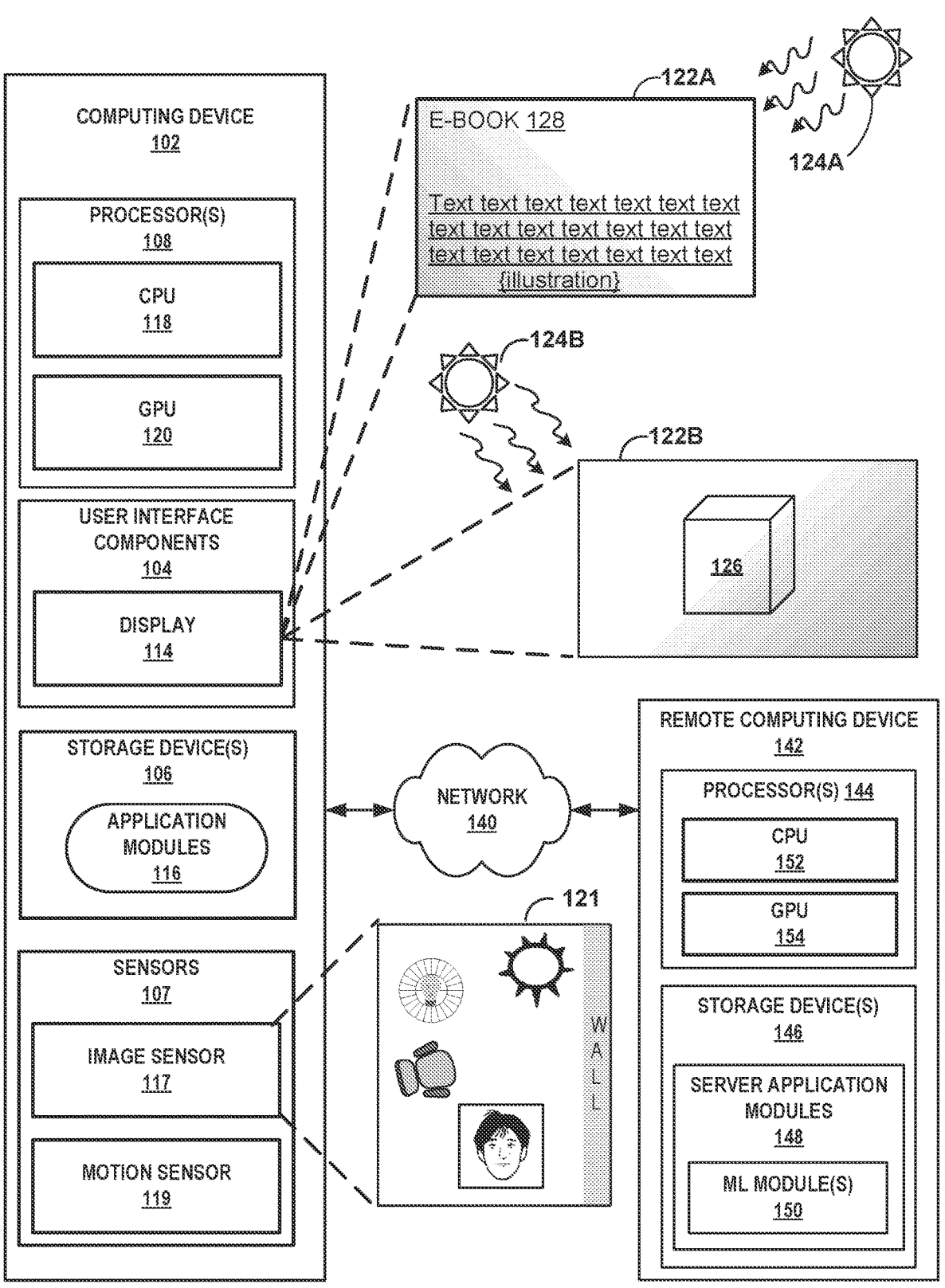
FIG. 1 is a conceptual diagram illustrating an example computing device that is configured to display, on a display of a computing device, a simulation of light reflecting off an object, in accordance with one or more aspects of the present disclosure.

FIG. 1 is a conceptual diagram illustrating an example computing device that is configured to display, on a display of a computing device, a simulation of light reflecting off an object, in accordance with one or more aspects of the present disclosure. In the example of FIG. 1, computing device 102 may include, but is not limited to, portable or mobile devices such as mobile phones (including smart phones), laptop computers, tablet computers, wearable computing devices such as smart watches or computerized eyewear, personal digital assistants (PDAs), etc. In some examples, computing device 102 may include stationary computing devices such as desktop computers, servers, mainframes, etc., and may be in communication with a remote computing device 142 over a network 140.

As shown in FIG. 1, computing device 102 includes user interface components 104 ("UIC 104"), storage devices 106, sensors 107, and processor(s) 108. The user interface components 104 includes display 114, storage devices 106 includes application modules 116, and sensors 107 include image sensor 117 and motion sensor 119. One or more of application modules 116 and one or more sensors 107 may perform operations described herein using software, hardware, firmware, or a mixture of both hardware, software, and firmware residing in, and executing on computing device 102, or in some instances, at one or more other remote computing devices, such as remote computing device 142.

Computing device 102 may execute application modules 116 with one or more processors 108 and may access and utilize the various components of computing device 102, such as user interface components 104, storage devices 106 and sensors 107. Computing device 102 may execute any of application modules 116 as or within a virtual machine executing on underlying hardware. Application modules 116 may be implemented in various ways. For example, any of application modules 116 may be implemented as a downloadable or pre-installed application or "app." In another example, any of application modules 116 may be implemented as part of an operating system (not shown) of computing device 102. Other examples of computing device 102 that implement techniques of this disclosure may include additional components not shown in FIG. 1.

Remote computing device 142 may execute server application modules 148, stored on storage devices 146, with one or more processors 144. Remote computing device 142 may execute server application modules 148, including one or more machine learning (ML) modules 150, as or within a virtual machine executing on underlying hardware. Other examples of remote computing device 142 that implement techniques of this disclosure may include additional components not shown in FIG. 1.

One or more processors 108 and one or more processors 144 may implement functionality and/or execute instructions within computing device 102 and remote computing device 142, respectively. For example, one or more processors 108 may receive and execute instructions that provide the functionality of application modules 116, UIC 104 including display 114, image sensor 117 and motion sensor 119 to perform one or more operations. However, the one or more operations associated with simulating the lighting around computing device 102 on display 114 may not be performed without first acquiring an image of the surrounding computing device 102 and processing that image accordingly to determine how to adjust the displayed image including the object to account for the detected light sources. That is, application modules 116, UIC 104, image sensor 117 and motion sensor 119 may be operable by processors 108 to determine, based on image frame 121 captured by image sensor 117, one or more characteristics of light produced by one or more light sources, and apply a light source image, generated with the one or more characteristics of light associated with one or more light sources, to an image of an object to generate an adjusted image to simulate effects of one or more light sources on the object, and output the adjusted image to display 114.

Similarly, one or more processors 144 may receive and execute instructions over network 140 that provide the functionality of the server application modules 148, including ML modules 150, to perform one or more operations and functions described herein (e.g., one or more application modules 116). For example, ML modules 150 may receive from application modules 116 of computing device 102 a mask image based on image frame 121 including the one or more characteristics of light produced by one or more light sources. ML modules 150 may, based on the received mask image, generate a light source image to communicate back to the computing device 102 to generate an adjusted image for output to display 114 to simulate effects of one or more light sources on the object.

In some examples, multiple instances of ML modules 150 may be parallelized to provide increased processing throughput. For example, the multiple instances of ML modules 150 may be parallelized on a single processing device or computing device or parallelized across multiple processing devices or computing devices. Each computing device that implements ML modules 150 or other aspects of the present disclosure may include a number of hardware components that enable performance of the techniques described herein. For example, each computing device (e.g., computing device 102 and remote computing device 142) may include one or more memory devices (e.g., storage devices 106 and storage devices 146) that store some or all of ML modules 150. For example, ML modules 150 may be a structured numerical representation that is stored in memory, and may be included or accessed by other modules, such as application modules 116 on storage device 106. The one or more memory devices may also include instructions for implementing ML modules 150 or performing other operations. Example memory devices include RAM, ROM, EEPROM, EPROM, flash memory devices, magnetic disks, and combinations thereof.

In the example of FIG. 1, one or more processors 108 and one or more processors 144 include central processing unit (CPU) 118 and graphics processing unit (GPU) 120, and CPU 152 and GPU 154, respectively. GPU 120 and GPU 154 may be a processing unit configured to configured to perform graphics related functions, such as to generate and output graphics data for presentation on a display, as well as to perform non-graphics related functions that exploit the massive processing parallelism provided by GPU 120 and GPU 154. Examples of CPU 118, GPU 120, CPU 152, and GPU 154 include, but are not limited to, a digital signal processor (DSP), a general-purpose microprocessor, a tensor processing unit (TPU); a neural processing unit (NPU); a neural processing engine; a core of a CPU, VPU, GPU, TPU, NPU or other processing device, an application specific integrated circuit (ASIC), a field programmable logic array (FPGA), or other equivalent integrated or discrete logic circuitry.

UIC 104 of computing device 102 may function as an input device for computing device 102 and as an output device, for example, with display 114. For instance, display 114 of UIC 104 may function as an input device using a resistive touchscreen, a surface acoustic wave touchscreen, a capacitive touchscreen, a projective capacitance touchscreen, a pressure sensitive screen, an acoustic pulse recognition touchscreen, or another presence-sensitive screen technology. Further, display 114 of UIC 104 may function as an output device using any one or more of a liquid crystal display (LCD), dot matrix display, light emitting diode (LED) display, miniLED, microLED, organic light-emitting diode (OLED) display, e-ink, or similar monochrome or color display capable of outputting visible information to the user of computing device 102.

In some examples, display 114 may be a presence-sensitive screen that may receive tactile user input from a user of computing device 102. UIC 104 may receive the tactile user input by detecting one or more taps and/or gestures from a user of computing device 102 (e.g., the user touching or pointing to one or more locations of UIC 104 with a finger or a stylus pen). The presence-sensitive screen of UIC 104 may present output to a user. UIC 104 may present the output as a user interface, which may be related to functionality provided by computing device 102. For example, UIC 104 may present various functions and applications executing on computing device 102 such as an electronic message application, a messaging application, a map application, etc.

Application modules 116 may interpret input data detected at display 114 of UIC 104 (e.g., as a user provides one or more gestures at a location) and receive sensor data acquired by sensors 107. For example, image data such as image frame 121 from image sensor 117, and motion data from motion sensor 119. Application modules 116 may relay the input data, sensor data, to one or more associated platforms, operating systems, applications, and/or services executing at computing device 102 or remote computing device 142 to cause computing device 102 to perform a function. One or more application modules 116 may also receive data and instructions from one or more associated platforms, operating systems, applications, and/or services executing at computing device 102 (e.g., sensors 107 or other application modules 116) or remote computing device 142 to further perform the function. For example, the function to simulate, on a display of a computing device, effects of one or more light sources on an object, in accordance with one or more aspects of the present disclosure.

The techniques and functions described herein to simulate and display the effects of one or more light sources on an object address the problem of how to display various types of content as if the object of the content is physically illuminated at the location of the computing device. For example, the appearance of how the light in a room may reflect off a physical page or other physical object to provide a user with a realistic and natural image of the object. By adjusting displayed content based at least in part on the light sources identified in a captured image of the environment of the computing device, techniques of this disclosure may enable a computing device to provide a more paper-like reading experience.

In one example, the one or more operations or functions associated with simulating, on the display of the computing device, the effects of one or more light sources on an object may not be performed without first capturing acquiring and processing image data of the area around the computing device.

In the example of FIG. 1, application modules 116 execute on one or more processors 108 to capture and process data at least from storage devices 106, and sensors 107. For example, to simulate on display 114, light reflecting off an object, such as the light source 124A off a page of text of an e-book 128 on adjusted image 122A of display 114, or light source 124B off a display object 126 of adjusted image 122B of display 114, image sensor 117 captures an image frame 121. The capture of image frame 121 may be done automatically or manually by a user of computing device 102. In either example, image sensor 117 only captures image frame 121 if the user has explicitly authorized the capture by computing device 102.

Returning to captured image frame 121, one or more application modules 116 executing on one or more processors 108 may determine, based on captured image frame 121, one or more characteristics of light produced by one or more light sources, such as light source 124A or 124B. One or more application modules 116 may generate an adjusted image, such as adjusted image 122A or 122B, by applying a light source image (not shown) that is generated with the one or more characteristics of light associated with one or more light sources, to an image of an object to simulate effects of one or more light sources on the object, such as object 126 or e-book 128. display 114

As illustrated in this example, the light source 124A is the location of the light source as represented by the adjusted image 122A generated by the overlay of a generated light source image (not shown) on a display image of e-book 128. Thus, as illustrated, the adjusted image 122A is lighter at the top right portion of and transitions to a darker portion in the bottom left corner, simulating natural lighting on the page of text of e-book 128 from light source 124A as if it were a printed book.

Similarly, in another example, the adjusted image 122B is an image associated with the object 126, such as an image file (e.g., JPG, GIF, etc.). As with the light source 124A, light source 124B is the light source as represented by the adjusted image 122B generated by the overlay of a generated light source image on a display image of the object 126. Thus, as illustrated, the adjusted image 122B is lighter in the top left and transitions to a darker portion in the bottom right corner, simulating natural lighting on the object 126 from light source 124B as if it were an object at the location of display 114. image sensor 117 e-book image sensor 117 display 114 In some examples, the lighting may change due to relative motion of computing device 102 resulting in an adjusted image that is no longer simulating the current environment around computing device 102. Thus, the computing device 102, in some examples, may detect motion from motion sensor 119 indicating computing device 102 and its display have shifted position. In response, computing device 102 may initiate the generation of a new light source image to overlay on the display image to create an adjusted image that simulates the effects of the change of one or more light sources on the object based on the detected motion.

Figure 2:
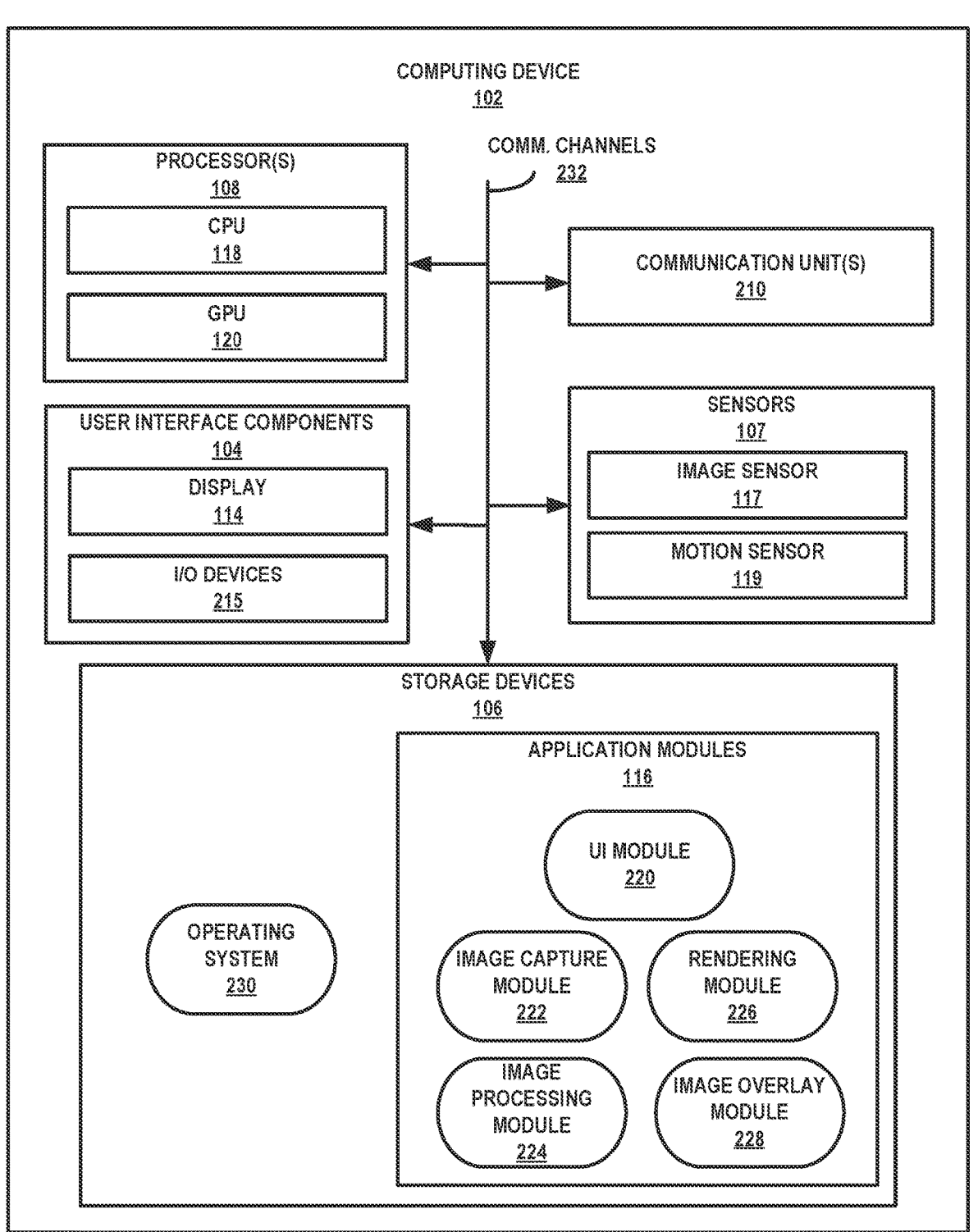
FIG. 2 is a block diagram illustrating an example computing device, in accordance with one or more aspects of the present disclosure.

FIG. 2 is a block diagram illustrating an example computing device, in accordance with one or more aspects of the present disclosure. FIG. 2 illustrates only one example of computing device 102, and many other examples of computing device 102 may be used in other instances and may include a subset of the components included in example computing device 102 or may include additional components not shown in FIG. 2.

As shown in the example of FIG. 2, computing device 102 includes one or more processors 108, one or more input/output components, such as user interface components 104, one or more communication units 210, one or more storage devices 106, and one or more sensors 107. Storage devices 106 of computing device 102 may include application modules 116 and operating system 230. Application modules 116 includes, but not limited to, user interface (UI) module 220, image capture module 222, image processing module 224, rending module 226, and image overlay module 228.

As shown in the example of FIG. 2, communication channels 232 may interconnect each of the components as shown for inter-component communications (physically, communicatively, and/or operatively). In some examples, communication channels 232 may include a system bus, a network connection (e.g., to network 140), one or more inter-process communication data structures, or any other components for communicating data between hardware and/or software locally or remotely (e.g., to remote computing device 142).

One or more processors 108 may implement functionality and/or execute instructions within computing device 102. For example, processors 108 on computing device 102 may receive and execute instructions stored by storage devices 106 that provide the functionality of operating system 230, UI module 220, image capture module 222, image processing module 224, rending module 226, and image overlay module 228. These instructions executed by processors 108 may cause computing device 102 to store and/or modify information, within storage devices 106 during program execution. Processors 108 may execute instructions of UI module 220, image capture module 222, image processing module 224, rending module 226, and image overlay module 228. That is, UI module 220, image capture module 222, image processing module 224, rending module 226, and image overlay module 228 may be operable by processors 108 to perform various functions described herein.

One or more processors 108 may include CPU 118 and GPU 120. GPU 120 may be a processing unit configured to perform graphics related functions, such as to generate and output graphics data for presentation on a display, as well as to perform non-graphics related functions that exploit the massive processing parallelism provided by GPU 120. Examples of CPU 118 and GPU 120 include, but are not limited to, a digital signal processor (DSP), a general-purpose microprocessor, application specific integrated circuit (ASIC), field programmable logic array (FPGA), or other equivalent integrated or discrete logic circuitry.

One or more I/O devices 215 and display 114 of user interface components 104 of computing device 102 may receive inputs and generate outputs. Examples of inputs are tactile, audio, kinetic, and optical input, to name only a few examples. Input devices of I/O devices 215, in one example, may include a touchscreen, a touch pad, a mouse, a keyboard, a voice responsive system, a video camera, buttons, a control pad, a microphone or any other type of device for detecting input from a human or machine. Output devices of I/O devices 215, in addition to display 114, in one example, may include a sound card, a video graphics adapter card, a speaker, or any other type of device for generating output to a human or machine.

One or more communication units 210 of computing device 102 may communicate with external devices by transmitting and/or receiving data at computing device 102, such as to and from application modules 116 and remote computing device 142. For example, computing device 102 may use communication units 210 to transmit and/or receive radio signals including data on a radio network such as a cellular network, or transmit and receive signals including data packets over a data network, such as network 140. Example communication units 210 include a network interface card (e.g., such as an Ethernet card), an optical transceiver, a radio frequency transceiver, a GPS receiver, or any other type of device that can send and/or receive information. Other examples of communication units 210 may include Bluetooth®, GPS, 3G, 4G, and Wi-Fi® radios found in mobile devices as well as Universal Serial Bus (USB) controllers and the like.

One or more storage devices 106 within computing device 102 may store information for processing during operation of computing device 102. In some examples, one or more storage devices of storage devices 106 may be a volatile or temporary memory. Examples of volatile memories include random access memories (RAM), dynamic random access memories (DRAM), static random access memories (SRAM), and other forms of volatile memories known in the art.

Storage devices 106, in some examples, may also include one or more computer-readable storage media. Storage devices 106 may be configured to store larger amounts of information for longer terms in non-volatile memory than volatile memory. Examples of non-volatile memories include magnetic hard discs, optical discs, floppy discs, flash memories, or forms of electrically programmable memories (EPROM) or electrically erasable and programmable (EEPROM) memories. Storage devices 106 may store program instructions and/or data associated with the operating system 230 and application modules 116, including UI module 220, image capture module 222, image processing module 224, rending module 226, and image overlay module 228.

As shown in FIG. 2, computing device 102 may include one or more sensors 107. Sensors 107 may include image sensor 117 and motion sensor 119. Motion sensor 119 may acquire motion data that indicates a change in acceleration or position of computing device 102 that may indicate the image (e.g., adjusted image 122A) of display 114 is no longer accurately simulating the surrounding light sources. Thus, motion sensor 119 may be used by one or more of the modules 116 to detect when the motion of display 114 exceeds a threshold value, which may result in at least one new image frame capture, and in some examples, an increased image frame capture rate used to generate one or more new adjusted images, as described above. Motion sensor 119 may include a gyroscope that generates gyroscope data that may indicate a physical orientation or a change in physical orientation of computing device 102.

In some example, the orientation may be relative to one or more reference points. Image sensor 117 may capture image data of an area or space around computing device 102 (e.g., image frame 121) that may be used to determine reference points for the orientation of computing device 102, which may result in at least one new image frame capture, and in some examples, an increased image frame capture rate used to generate one or more new adjusted images, as described above.

In some examples, one or more processors 108 of computing device 102 may be configured to execute image capture module 222 image capture module 222 and image processing module 224. Image sensor 117 may capture image data, such as image frame 121, at a frame rate determined by image capture module 222. As discussed above, the capture of image frame 121 may be done automatically or manually by a user of computing device 102. However, to maintain the privacy of the user, image sensor 117 only captures image frame 121 if the user has explicitly authorized the capture by computing device 102.

Image processing module 224 receives the image data to determine one or more characteristics of light produced by one or more light sources within the captured image (e.g., image frame 121). Image processing module 224 generates a mask image from one or more objects identified within the scene of the captured image as determined by the one or more characteristics of light. These objects may be determined from the image by various image analysis techniques run locally or remotely, such as image texture analysis, class object detectors and the like.

In one example, image processing module 224 may include a trained class object detector algorithm to identify one or more items in the image frame (e.g., image frame 121). Various class object detector algorithms include, but are not limited to, Fast R-CNN, Histogram of Oriented Gradients (HOG), Region-based Convolutional Neural Networks (R-CNN), Region-based Fully Convolutional Network (R-FCN), Single Shot Detector (SSD), Spatial Pyramid Pooling (SPP-net), and YOLO (You Only Look Once).

Items detected, according to one example, are compared to known (labeled) items and given labels accordingly. Once the objects have been identified and labeled, in one example, image processing module 224 may determine out which of the identified and labeled items of the image frame (e.g., image frame 121) are associated with one or more light sources to include in the generation of the mask image. For example, the class object detector algorithm of image processing module 224 may identify and label four objects, including a chair, a wall, a lamp, and a desk. Image processing module 224 may be configured to generate the mask image based on the labeled objects that are potential light sources, whether direct (e.g., lamp) or indirect (e.g., wall), and ignore the labeled objects that are typically not potential light sources (e.g., desk and chair). In another example, the mask image includes all the identified and labeled items and which of the labeled items are associated with one or more light sources may be determined by another module, such as rendering module 226.

Image processing module 224, according to another example, may use an image texture analysis algorithm to identify regions corresponding to boundaries associated with one or more items in the image frame (e.g., image frame 121). Texture analysis characterizes regions in an image by their texture content. Texture analysis algorithms use texture segmentation to find the texture boundaries with an image by quantifying qualities such as rough, smooth, silky, or bumpy as a function of the spatial variation in pixel intensities of an image. For example, image processing module 224 configured to implement a texture analysis algorithm may generate a mask image that only includes items within the image frame that are determined to have characteristics associated with light sources (direct and indirect), such as smooth or silky, and ignore those items that do not, such as bumpy or rough.

In accordance with techniques of the disclosure, one or more processors 108 of computing device 102 may be configured to execute rendering module 226 that receives the mask image generated by image processing module 224 and generates the light source image for image overlay module 228 to create an adjusted image for display (e.g., by the UI module 220) that includes the original image as realistically shown with respect to the light source observed by image capture module 222, as discussed above. For example, rendering module 226 may take the received mask image and compute the light source image such that each pixel of the light source image is a RGB (red-green-blue) color amplification to be applied or overlayed, by image overlay module 228, on to the original object image to generate the adjusted image. Image overlay module 228 may use any image overlay technique to generate the adjusted image, such as a linear interpolation and the like. For example, a linear interpolation operator such as S=(1−a)*A+ a*B, where A is the display image (base image), B is the light source image to be overlaid, and "a" is a weight parameter between 0 and 1 that controls the emphasis of the overlay of the light source image, and S the adjusted image.

In one example, rendering module 226 includes an architecture of a trained machine learning model, such as a fully convolutional network transform, autoencoder networks and the like. During training, the ground truth light source image may be obtained in-lab through, for example, user-experience (UXR) surveys of what would be the most visually pleasing optical overlay for the adjusted image that represents the scene lighting in a physically accurate way. The dataset for supervised learning offline, in this example, includes the captured image frame (e.g., image frame 121), obtained through image capture module 222 from image sensor 117, and the mask image from image processing module 224. The trained machine learning model may then be ported to the rending module 226, which in some examples, may be configured to execute on one or both computing device 102 or remotely on-cloud (e.g., see server device 560 of FIG. 5) depending on connectivity and computational demands computing device 102.

Returning to FIG. 1, in some examples, one or more processors 144 of remote computing device 142 may be configured to receive the captured image frame (e.g., image frame 121) from computing device 102 over network 140 and execute the functionality of image processing module 224 in one or more server application modules 148, such as ML modules 150 including one or more ML models (e.g., class object detector or image detector analysis), to create a mask image. The mask image generated at remote computing device 142 may be provided to another ML model of ML modules 150-b (e.g., fully convolutional network transform ML model) to generate the light source image for communication back to the computing device 102.

In another example, one or more processors 144 of remote computing device 142 may be configured to receive the mask image from the computing device 102 over network 140 and execute the functionality of rendering module 226 in one or more server application modules 148, such as an ML model of ML modules 150, to create the light source image. Remote computing device 142 may communicate the light source image over network 140 to image overlay module 228 at computing device 102 for generating the adjusted image to display on display 114.

In one example, the image frame capture rate may have an initial default setting of 5 frames per second (fps), and image capture module 222 may increase or decrease the rate dynamically or be set by the user depending on factors such as a change in device or display conditions, device type, computational demands, or connectivity.

In one example, the lighting around display 114 of computing device 102 may change depending on such factors as a change in the sun through a window or an overhead light switching on. In this example display 114 is static but the light source changes (e.g., sun position or lamp switched on). In response, image processing module 224, based on the default image frame capture rate, detects the change in the captured image frame (e.g., image frame 121) and the remaining modules, as discussed above, generate a new adjusted image.

In another example, image capture module 222 receives an indication of motion from sensors 107 (e.g., image sensor 117 or motion sensor 119). If the amount of motion exceeds a threshold value image capture module 222 may temporarily increase the image frame capture rate (e.g., 30 fps) resulting in an increased output of adjusted images to compensate for the change in lighting based on the motion (e.g., tilt, rotation, or change in location). This provides a user with a spatiotemporal coherent look with respect to the characteristic of light associated with the light source(s) of the room.

The images captured and generated, as discussed above in the various examples, may be any one, or combination of, digital representations that may be accessed, processed, and stored by the various processors, storage devices and modules described herein with respect to computing device 102 and remote computing device 142. Example digital representations include, but are not limited to, RAW, TIFF, GIF, PNG, BMP, PDF, EPS, and the like.

In situations in which the systems discussed herein may collect personal information (i.e., data) about the user to the extent it includes and may make use of the user's personal information, such as the content on display 114 and the capture and processing of image frame 121 by image processing capture module 222 and image processing module 224, the user may be provided with an opportunity to control whether, and to what extent, programs or features collect the user's information (e.g., e.g., screen content, image captures of the user's surrounding environment, motion and/or location of the computing device, etc.), or to control whether and/or how to receive content from the content server that may be more relevant to the user. In addition, certain data may be treated in one or more ways before it is stored or used, so that personally identifiable information is removed. For example, the user's identity may be treated so that no personally identifiable information can be determined for the user, or the user's geographic location may be generalized where location information is obtained (such as to a city, ZIP code, or state level), so that a particular location of the user cannot be determined. Thus, the user may have control over how information is collected about the user and used by computing device 102 and remote computing device 142 of FIG. 1.

Figure 3:
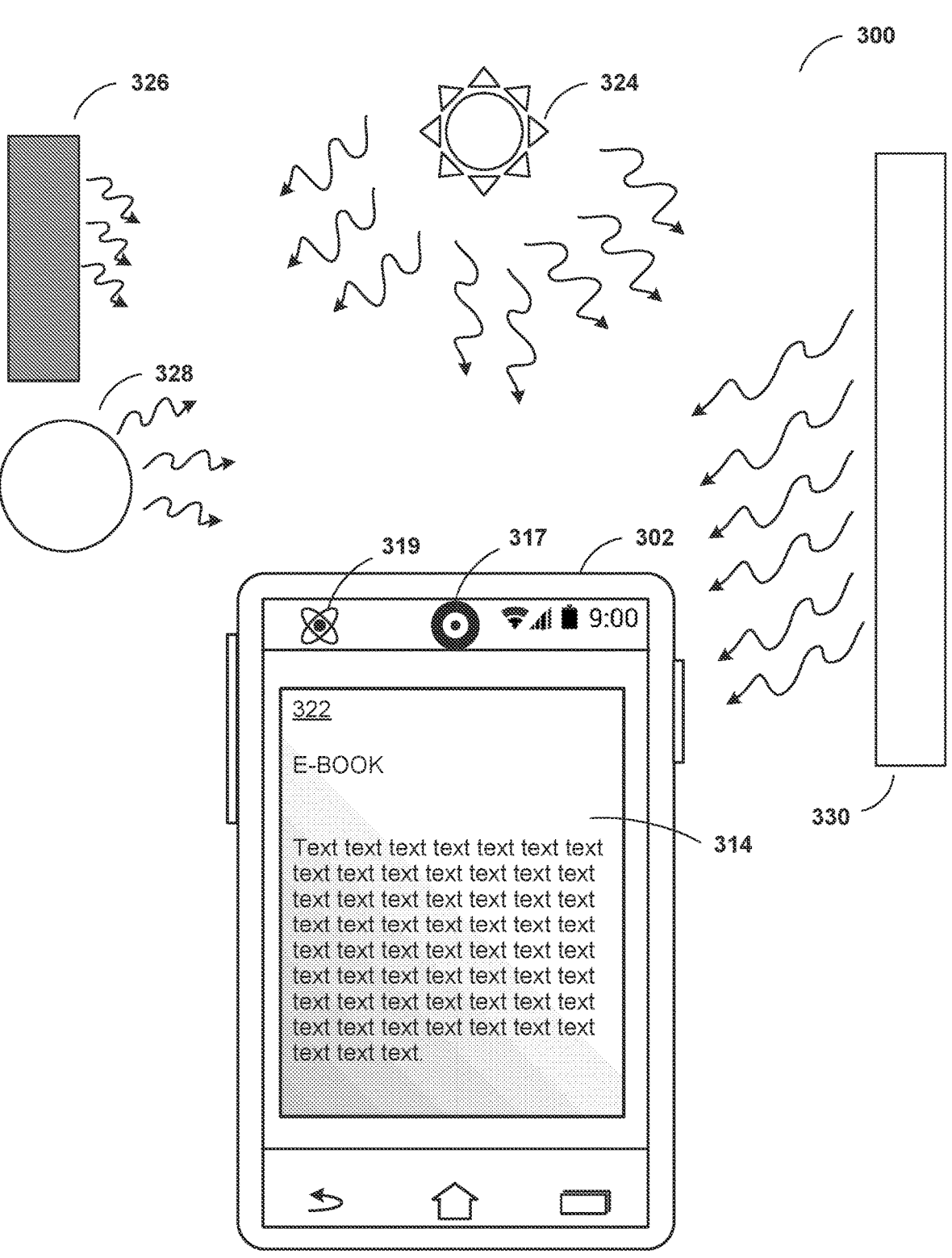
FIG. 3 is a diagram illustrating a lighted space that includes a computing device in the form of a handheld device and a plurality of potential light sources, in accordance with one or more aspects of the present disclosure.

FIG. 3 is a diagram illustrating lighted space 300 that includes computing device 302 in the form of a handheld device and a plurality of potential light sources, in accordance with one or more aspects of the present disclosure. Computing device 302, in this example, include all the components of computing device 102 as described with respect to FIG. 1 and FIG. 2 above, including display 314, image sensor 317, and motion sensor 319.

As shown in the example of FIG. 3, primary light source 324 illuminates a multitude of objects within lighted space 300. Display 314 of computing device 302, in the example of FIG. 3, illustrates the display of an e-book as shown on adjusted image 322 to simulate viewing the text displayed on e-book as a user would view a paper book in the natural lighting of lighted space 300.

Primary light source 324 may be from a variety of sources, such as sunlight through a window, a light fixture in a ceiling, a lamp on a table, and so on. As used herein, a light source may be an active light source that generates light (e.g., light bulb) or a passive light source that reflects light (e.g., a wall). Although primary light source 324 is shown as a single source in this example, in other examples there may be two or more primary light sources 324 in lighted space 300. That is, primary light source 324 may be one potential light source of a plurality of potential light sources shown in FIG. 3 as items 324-330.

For simplicity, example characteristics of light associated with items 324-330 (i.e., potential light sources) are represented by specific shapes, shades of grey, and emanation or reflection of light waves. In one example, the shades of grey represent each item's reflectivity and luminance where white may indicate highly reflective (e.g., white wall) or a primary light source (e.g., bulb, sun), while darker items may absorb and reflect or emanate little light. The shapes may represent the items in the lighted space, for example, a lamp, a wall, a chair, a bookcase, a painting, a desk, etc.

In one example, image sensor 317 captures an image frame of lighted space 300 that includes the items within its field of view, such as items 324-330. Computing device 302 includes an image processing module (e.g., image processing module 224) to determine and identify each of items 324-330 in the image frame (e.g., image frame 121). As discussed above, in some examples, this may be by labeling each identified object or detecting textural boundaries of each object using a class object detector algorithm or a texture analysis algorithm. The detected items may then be filtered based on at least the characteristics of light for each item.

For example, a class object detector may identify item 324 as a light fixture, item 326 as a table, item 328 as lamp, and item 330 as a wall. The image processing module generates a mask image of only those items that may be a potential light source, in this example, item 324 (light fixture), item 328 (lamp), and item 330 (wall). In another example, texture analysis algorithm may determine item 324 (light fixture), item 328 (lamp), and item 330 (wall) has a "smooth" texture, and item 326 (table) has a "rough" texture. In response, the image processing module ignores items that have a "rough" texture and generates a mask image of only those items that have the "smooth" texture (i.e., may potential light sources).

As discussed above with reference to FIG. 1 and FIG. 2, once the mask image is generated, computing device 302 may process the mask image locally or upload the mask image for processing remotely by a remote computing system, such as remote computing device 142. In either the local or remote example, the mask image is communicated to and received by a rendering module, such as rendering module 226 locally or ML modules 150 remotely, that include a machine learning model (e.g., a fully convolutional network transform ML model) to generate from the mask image a light source image. Image overlay module (e.g., image overlay module 228 receives the light source image and generates adjusted image 322 to output to display 314. As shown in the example of FIG. 3, adjusted image 322 displayed on the display 314 illustrates how the text of the e-book would look as if it were a physical object (e.g., paperback book) illuminated by light sources (e.g., item 324, item 328, and item 330) in lighted space 300.

In one example, the image capture module (e.g., image capture module 222) receives an indication of motion from motion sensor 319 of computing device 302. As discussed above with reference to FIG. 1 and FIG. 2, if an amount of motion exceeds a threshold value computing device 302 may increase the image frame capture rate (e.g., temporarily to 30 fps) resulting in computing device 302 increasing output of adjusted images to compensate for the change in lighting based on the motion. Once the motion falls behold the threshold representing a stable lighting condition, computing device 302 may decrease the image capture rate (e.g., 5 fps) to reduce processing overhead, increase performance, and save battery life of computing device 302. These adjustments based on detected motion provide a user with a natural look with respect to the object (e.g., e-book text) and the characteristics of the light associated with the light source(s) of lighted space 300.

FIG. 4 is a flowchart illustrating an example mode of operation for a computing device to simulate, on a display of a computing device, effects of one or more light sources on the object, in accordance with one or more techniques of the present disclosure. FIG. 4 is described below in the context of computing device 102 of FIG. 1 and FIG. 2. As shown in FIG. 4, computing device 102 may capture, by image sensor 117, an image frame (e.g., image frame 121) (402). Computing device 102 may determine, by one or more processors 108 of computing device 102 and based on the image frame, one or more characteristics of light produced by one or more light sources (e.g., items 324-330) (404). Computing device 102 may generate, by one or more processors 108, an adjusted image (e.g., 122A, 112B, and 322 of FIG. 3) by at least applying a light source image generated, with the one or more characteristics of light associated with one or more light sources, to an image of an object (e.g., e-book text image) to simulate effects of one or more light sources on the object (406). Computing device 102 may output, by one or more processors 108 and for display on display 114, the adjusted image (e.g., see 122A, 112B, and 322 of FIG. 3) (408).

This disclosure includes the following examples.

Example 1

A method comprising: capturing, by an image sensor of a computing device, an image frame determining, by one or more processors of the computing device and based on the image frame, one or more characteristics of light produced by one or more light sources, generating, by the one or more processors, an adjusted image by at least applying, by the one or more processors, a light source image generated, with the one or more characteristics of light associated with one or more light sources, to an image of an object to simulate effects of one or more light sources on the object, and outputting, by the one or more processors and for display, the adjusted image.

Example 2

The method of example 1, further comprising: generating a mask image with the one or more characteristics of light produced by one or more light sources.

Example 3

The method of example 2, wherein generating the mask image further comprises: identifying, by the one or more processors, one or more items in the image frame; determining, by the one or more processors, one or more labels that correspond to the one or more items identified in the image frame; and generating, based on the labeled items, the mask image corresponding to one or more light sources.

Example 4

The method of example 3, wherein the identifying the one or more items further comprises: identifying, by the one or more processors, the one or more items within the image frame with a class object detector.

Example 5

The method of example 2, wherein generating the mask image further comprises: generating, by the one or more processors with image texture analysis, a texture map of boundaries corresponding to surface textures from the image; and generating, by the one or more processors, the mask image associated with one or more light sources based on the texture map.

Example 6

The method of any one of examples 2-5, wherein generating the mask image further comprises: sending the one or more characteristics of light produced by one or more light sources to a remote computing device to identify the one or more items identified in the image frame corresponding to one or more light sources, and to generate the mask image; and receiving the mask image from the remote computing device.

Example 7

The method of any one of examples 2-6, further comprising:
computing, by the remote computing device, the light source image with a machine learning model trained to generate the light source image based on the mask image.

Example 8

The method of any one of examples 2-6, further comprising: sending, from the computing device to a remote computing device, the mask image; and receiving, by the computing device, and from the remote computing device, the light source image generated using the mask image.

Example 9

The method of any one of examples 1-8, further comprising:
determining, by the computing device, whether movement of the display satisfies a threshold value; responsive to determining that the movement is greater than the threshold value, capturing, by the computing device, image frames at a rate of at least 30 cycles per second (Hz); and responsive to determining that the movement is less than the threshold value, capturing, by the computing device, capturing image frames at a rate less than 30 cycles per second (Hz).

Example 10

The method of example 9, further comprising: receiving, by the computing device, motion data generated by a motion sensor of the display device, wherein determining whether the movement of the display satisfies the threshold is based on the motion data.

Example 11

A computing device comprising: memory; and one or more processors operably coupled to the memory and configured to: capture, by an image sensor of the computing device, an image frame; determine, based on the image frame, one or more characteristics of light produced by one or more light sources; apply a light source image, generated with the one or more characteristics of light associated with one or more light sources, to an image of an object to generate an adjusted image to simulate effects of one or more light sources on the object; and output, for display by the computing device, the adjusted image.

Example 12

The computing device of example 11, wherein the one or more processors are further configured to generate a mask image with the one or more characteristics of light produced by one or more light sources.

Example 13

The computing device of example 12, wherein the one or more processors are further configured to: identify, by the one or more processors, one or more items in the image frame; determine, by the one or more processors, one or more labels that correspond to the one or more items identified in the image frame; and generate, based on the labeled items, the mask image corresponding to one or more light sources.

Example 14

The computing device of example 12, wherein to identify the one or more items, the one or more processors are further configured to: identify, by the one or more processors, the one or more items within the image frame with a class object detector.

Example 15

The computing device of example 12, wherein to generate the mask image, the one or more processors are further configured to: generate, by the one or more processors with image texture analysis, a texture map of boundaries corresponding to surface textures from the image; and generate, by the one or more processors, the mask image associated with one or more light sources based on the texture map.

Example 16

The computing device of any of examples 12-15, wherein to generate the mask image, the one or more processors are further configured to: send the one or more characteristics of light produced by one or more light sources to a remote computing device to identify the one or more items identified in the image frame corresponding to one or more light sources, and to generate the mask image; and receive the mask image from the remote computing device.

Example 17

The computing device of any of examples 12-16, wherein the one or more processors are further configured to: computing, by the remote computing device, the light source image with a machine learning model trained to generate the light source image based on the mask image.

Example 18

The computing device of any of examples 12-16, wherein the one or more processors are further configured to: send, from the computing device to a remote computing device, the mask image; and receive, by the computing device, and from the remote computing device, the light source image generated using the mask image.

Example 19

The computing device of any of examples 11-18, wherein the one or more processors are further configured to: determining, by the computing device, whether movement of the display satisfies a threshold value; responsive to determining that the movement is greater than the threshold value, capturing, by the computing device, image frames at a rate of at least 30 cycles per second (Hz); and responsive to determining that the movement is less than the threshold value, capturing, by the computing device, capturing image frames at a rate less than 30 cycles per second (Hz).

Example 20

The computing device of example 19, wherein the one or more processors are further configured to: receiving, by the computing device, motion data generated by a motion sensor of the display device, wherein determining whether the movement of the display satisfies the threshold is based on the motion data.

Example 21

A computer-readable storage medium encoded with instructions that cause one or more processors of a computing device to perform the methods of any one of examples 1-10.

Example 22

A computing device comprising means for performing the method recited by any of examples 1-10.

By way of example, and not limitation, such computer-readable storage media can comprise RAM, ROM, EEPROM, CD-ROM or other optical disk storage, magnetic disk storage, or other magnetic storage devices, flash memory, or any other storage medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage mediums and media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable medium.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various examples have been described. These and other examples are within the scope of the following claims.

What is claimed is:

1. A method comprising:

capturing, by an image sensor of a computing device, an image frame;

determining, by one or more processors of the computing device and based on the image frame, one or more characteristics of light produced by one or more light sources;

identifying, by the one or more processors, one or more items in the image frame;

determining, by the one or more processors, one or more labels that correspond to the one or more items identified in the image frame;

generating, based on the one or more labels, a mask image corresponding to the one or more light sources;

generating, by the one or more processors, an adjusted image by at least applying a light source image to an image of an object to simulate effects of the one or more light sources on the object, wherein the light source image is generated based on the one or more characteristics of light produced by the one or more light sources associated with the mask image; and outputting, by the one or more processors and for display, the adjusted image.

2. The method of claim 1, wherein the identifying the one or more items further comprises:

identifying, by the one or more processors, the one or more items within the image frame with a class object detector.

3. The method of claim 1, wherein generating the mask image further comprises:

generating, by the one or more processors with image texture analysis, a texture map of boundaries corresponding to surface textures from the image; and generating, by the one or more processors, the mask image associated with the one or more light sources based on the texture map.

4. The method of claim 1, wherein generating the mask image further comprises:

18 sending the one or more characteristics of light produced by one or more light sources to a remote computing device to identify one or more items in the image frame corresponding to the one or more light sources, and to generate the mask image; and receiving the mask image from the remote computing device.

5. The method of claim 1, further comprising:

computing the light source image with a machine learning model trained to generate the light source image based on the mask image.

6. The method of claim 1, further comprising:

sending, from the computing device to a remote computing device, the mask image; and receiving, by the computing device, and from the remote computing device, the light source image generated using the mask image.

7. The method of claim 1, further comprising:

determining, by the computing device, whether movement of a display device satisfies a threshold value;

responsive to determining that the movement is greater than the threshold value, capturing, by the computing device, image frames at a rate of at least 30 cycles per second (Hz); and responsive to determining that the movement is less than the threshold value, capturing, by the computing device, image frames at a rate less than 30 cycles per second (Hz).

8. The method of claim 7, further comprising:

receiving, by the computing device, motion data generated by a motion sensor of the display device, wherein determining whether the movement of the display satisfies the threshold value is based on the motion data.

9. A computing device comprising:

an image sensor configured to capture an image frame;

a display device;

a memory; and one or more processors operably coupled to the memory and configured to:

determine, based on the image frame, one or more characteristics of light produced by one or more light sources;

identify one or more items in the image frame;

determine one or more labels that correspond to the one or more items identified in the image frame;

generate, based on the one or more labels, a mask image corresponding to the one or more light sources;

apply a light source image, generated with the one or more characteristics of light associated with the one or more light sources associated with the mask image, to an image of an object to generate an adjusted image to simulate effects of the one or more light sources on the object; and output, for display by the display device, the adjusted image.

10. The computing device of claim 9, wherein the one or more processors are configured to generate the mask image by at least being configured to:

send, to a remote computing device, the one or more characteristics of light produced by one or more light sources remote computing device to identify one or more items in the image frame corresponding to the one or more light sources, and to generate the mask image; and receive, from the remote computing device, the mask image generated by at least applying a machine learning model to the mask image.

11. The computing device of claim 9, wherein the one or more processors are configured to generate the mask image by at least being configured to:

generate a texture map of boundaries corresponding to surface textures from the image; and generate the mask image associated with the one or more light sources based on the texture map.

12. The computing device of claim 9, wherein the one or more processors are configured to generate the mask image by at least being configured to:

identify one or more items in the image frame;

determine one or more labels that correspond to the one or more items identified in the image frame; and generate, based on the one or more labels, the mask image corresponding to the one or more light sources.

13. The computing device of claim 9, further comprising:

one or more motion sensors that generate motion data based on movement of the computing device, wherein the one or more processors are further configured to:

determine, based on the motion data, whether movement of the display device satisfies a threshold value;

responsive to determining that the movement is greater than the threshold value, capture, using the image sensor, image frames at a rate of at least 30 cycles per second (Hz); and responsive to determining that the movement is less than the threshold value, capture, using the image sensor, image frames at a rate less than 30 cycles per second (Hz).

14. A non-transitory computer-readable medium encoded with instructions that, when executed by one or more processors of a computing device, cause the one or more processors to:

capture, using an image sensor of the computing device, an image frame;

determine, based on the image frame, one or more characteristics of light produced by one or more light sources;

identify one or more items in the image frame;

determine one or more labels that correspond to the one or more items identified in the image frame;

generate, based on the one or more labels, a mask image corresponding to the one or more light sources;

generate an adjusted image by at least applying a light source image to an image of an object to simulate effects of the one or more light sources on the object, wherein the light source image is generated based on the one or more characteristics of light produced by the one or more light sources associated with the mask image; and output, for display, the adjusted image.

15. The non-transitory computer-readable medium of claim 14, wherein the instructions further cause the one or more processors to:

determine whether movement of a display device satisfies a threshold value;

responsive to determining that the movement is greater than the threshold value, capture image frames at a rate of at least 30 cycles per second (Hz); and responsive to determining that the movement is less than the threshold value, capture image frames at a rate less than 30 cycles per second (Hz).

16. The non-transitory computer-readable medium of claim 14, wherein the instructions cause the one or more processors to generate the mask image by at least causing the one or more processors to:

send, to a remote computing device, the one or more characteristics of light produced by one or more light sources remote computing device to identify one or more items in the image frame corresponding to the one or more light sources, and to generate the mask image; and receive, from the remote computing device, the mask image generated by at least applying a machine learning model to the mask image.

17. The non-transitory computer-readable medium of claim 14, wherein the instructions cause the one or more processors to generate the mask image by at least causing the one or more processors to:

generate a texture map of boundaries corresponding to surface textures from the image; and generate the mask image associated with the one or more light sources based on the texture map.

18. The non-transitory computer-readable medium of claim 14, wherein the instructions cause the one or more processors to generate the mask image by at least causing the one or more processors to:

identify one or more items in the image frame;

determine one or more labels that correspond to the one or more items identified in the image frame; and generate, based on the one or more labels, the mask image corresponding to the one or more light sources.

19. The non-transitory computer-readable medium of claim 14, wherein the instructions further cause the one or more processors to:

generate, using one or more motion sensors, motion data based on movement of the computing device, determine, based on the motion data, whether movement of a display device of the computing device satisfies a threshold value;

responsive to determining that the movement is greater than the threshold value, capture, using the image sensor, image frames at a rate of at least 30 cycles per second (Hz); and responsive to determining that the movement is less than the threshold value, capture, using the image sensor, image frames at a rate less than 30 cycles per second (Hz).

* * * * *